United States Patent
Sakurai et al.

(10) Patent No.: US 11,822,347 B2
(45) Date of Patent: Nov. 21, 2023

(54) DELIVERY SYSTEM

(71) Applicant: TOYOTA JIDOSHA KABUSHIKI KAISHA, Toyota (JP)

(72) Inventors: Hideyuki Sakurai, Toyota (JP); Nobuhiro Nakano, Nagakute (JP); Kazuhisa Maeda, Toyota (JP); Yohei Tanigawa, Toyota (JP); Keisuke Itou, Tokyo (JP); Kantarou Shinma, Tokyo (JP); Nobuki Hayashi, Nisshin (JP); Tetsuro Sakaguchi, Toyota (JP); Yukari Ogawa, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 93 days.

(21) Appl. No.: 17/549,412

(22) Filed: Dec. 13, 2021

(65) Prior Publication Data
US 2022/0197310 A1 Jun. 23, 2022

(30) Foreign Application Priority Data

Dec. 18, 2020 (JP) .................................. 2020-210118

(51) Int. Cl.
*G05D 1/10* (2006.01)
*B64C 39/02* (2023.01)
(Continued)

(52) U.S. Cl.
CPC ........... *G05D 1/101* (2013.01); *B64C 39/024* (2013.01); *B64U 10/30* (2023.01); *B64U 2101/60* (2023.01); *G05D 2201/0216* (2013.01)

(58) Field of Classification Search
CPC ............ G05D 1/101; G05D 2201/0216; B64C 39/024; B64C 35/00; B64C 39/02;
(Continued)

(56) References Cited

U.S. PATENT DOCUMENTS 10,514,690 B1 * 12/2019 Siegel .............. G06Q 10/08355
2014/0032034 A1 * 1/2014 Raptopoulos ...... H04B 7/18506
701/25

(Continued)

FOREIGN PATENT DOCUMENTS

JP 2000322154 A * 11/2000
JP 2019-533224 A 11/2019
(Continued)

OTHER PUBLICATIONS

Machine Translation: WO-2019138447-A1 (Year: 2019).*
Machine Translation: JP-2020051176-A (Year: 2020).*
Machine Translation: JP-2000322154-A (Year: 2000).*

*Primary Examiner* — Anne Marie Antonucci
*Assistant Examiner* — Connor L Knight
(74) *Attorney, Agent, or Firm* — Oliff PLC

(57) ABSTRACT

A delivery system includes a cooking station, a meal serving station, a drone, a meal conveying device configured to convey a meal from the cooking station to the meal serving station, and a controlling portion. A character of a theme park is displayed on the drone. The controlling portion causes the drone to fly from the cooking station to the meal serving station and causes the meal conveying device to convey the meal from the cooking station to the meal serving station such that, just after the drone has arrived at the meal serving station, the meal conveyed by the meal conveying device is served to a visitor from the meal serving station.

5 Claims, 1 Drawing Sheet

(51) Int. Cl.
*B64U 10/30* (2023.01)
*B64U 101/60* (2023.01)

(58) Field of Classification Search
CPC ............... B64U 10/30; B64U 2101/60; G06Q 10/0832; G06Q 10/083
See application file for complete search history.

(56) References Cited

U.S. PATENT DOCUMENTS

| | | | |
|---|---|---|---|
| 2019/0126945 A1* | 5/2019 | Stubler | B61B 13/122 |
| 2020/0167722 A1* | 5/2020 | Goldberg | G06Q 10/0832 |
| 2020/0286034 A1* | 9/2020 | Ur | G06Q 10/08355 |
| 2021/0027638 A1* | 1/2021 | Hovey | G08G 5/0043 |
| 2021/0256795 A1* | 8/2021 | Ferguson | G05D 1/0276 |

FOREIGN PATENT DOCUMENTS

| | | | | |
|---|---|---|---|---|
| JP | 2020051176 A | * | 4/2020 | |
| WO | 2018/035578 A1 | | 3/2018 | |
| WO | WO-2019138447 A1 | * | 7/2019 | ........... A47G 29/141 |

* cited by examiner

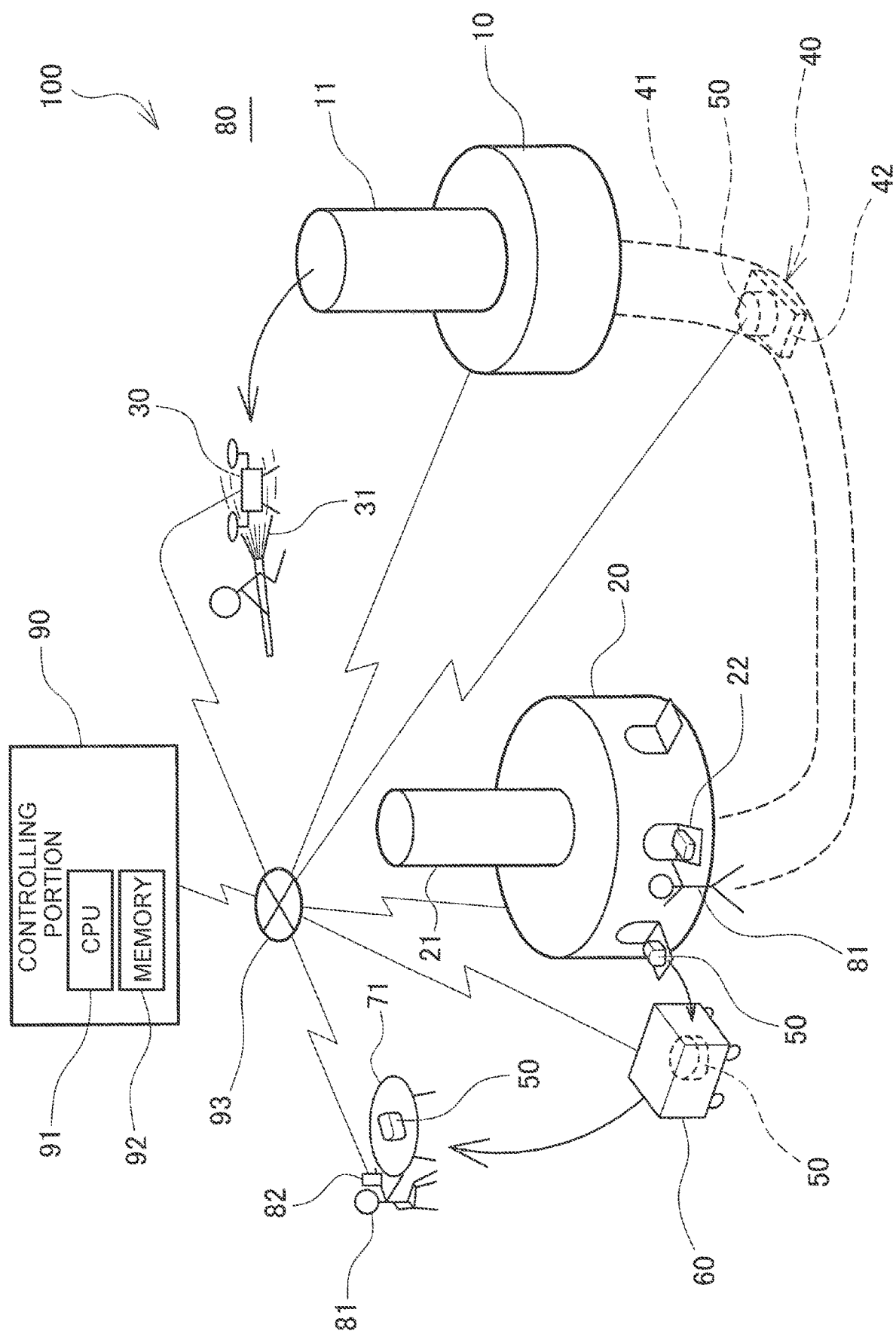

DELIVERY SYSTEM

CROSS-REFERENCE TO RELATED APPLICATION

This application claims priority to Japanese Patent Application No. 2020-210118 filed on Dec. 18, 2020, incorporated herein by reference in its entirety.

BACKGROUND

1. Technical Field

The present disclosure relates to a delivery system configured to deliver a manufactured article from a manufacturing station to a delivery station in a predetermined area.

2. Description of Related Art

In recent years, a system in which a product is delivered by use of a drone has been considered. For example, Japanese Unexamined Patent Application Publication (Translation of PCT Application) No. 2019-533224 (JP 2019-533224 A) proposes a system in which a freshly baked pizza is delivered by use of a drone.

SUMMARY

In the meantime, various tourist facilities have been built recently. In a predetermined area such as the tourist facilities, it is important that visitors spend time happily and arrive there repeatedly many times. In view of this, such a system has been considered that the visitors in the predetermined area such as the tourist facilities are caused to feel as if they spend time with characters in attractions, so that a feeling of closeness to the characters improves and the visitors feel more fun. As an example, it is considered to deliver a manufactured article manufactured in the predetermined area, by use of a drone decorated with a character.

However, in a case where a manufactured article is actually delivered by a drone, a system for the delivery is complicated, and it is often difficult to freely fly a drone on which a manufactured article is hanging in the sky above the visitors in the predetermined area such as the tourist facilities where many people arrive.

In view of this, an object of the present disclosure is to provide a delivery system in which visitors in a predetermined area can spend time happily in the predetermined area by causing the visitors to feel as if manufactured articles are delivered by characters with unmanned aerial vehicles.

A delivery system of the present disclosure is a delivery system in a predetermined area. The delivery system includes a manufacturing station, a delivery station, an unmanned aerial vehicle, a manufactured-article conveying device, and a controlling portion. The unmanned aerial vehicle is configured to go back and force between the manufacturing station and the delivery station. The manufactured-article conveying device is configured to convey a manufactured article from the manufacturing station to the delivery station. The controlling portion is configured to adjust operations of the unmanned aerial vehicle and the manufactured-article conveying device. The unmanned aerial vehicle is decorated with display of the predetermined area. The controlling portion is configured to cause the unmanned aerial vehicle to fly from the manufacturing station toward the delivery station and to cause the manufactured-article conveying device to convey the manufactured article from the manufacturing station to the delivery station such that, just after the unmanned aerial vehicle has arrived at the delivery station, the manufactured article conveyed by the manufactured-article conveying device is served from the delivery station to a visitor in the predetermined area.

As such, just after the unmanned aerial vehicle on which the character is displayed has arrived at the delivery station, the manufactured article conveyed by the manufactured-article conveying device is served from the delivery station to the visitor in the predetermined area. This makes it possible to cause the visitor in the predetermined area to feel as if the manufactured article is delivered by the character with the unmanned aerial vehicle. Hereby, the visitor can spend time happily in the predetermined area.

In the delivery system of the present disclosure, the manufactured-article conveying device may be a manufactured-article conveying passage via which the manufacturing station is connected to the delivery station under the ground.

Since the manufactured article is conveyed through the manufactured-article conveying passage provided under the ground that is not observable from the visitor, it is possible to cause the visitor to feel as if the manufactured article is delivered by the character with the unmanned aerial vehicle.

In the delivery system of the present disclosure, the manufactured-article conveying device may be a self-driving vehicle.

Hereby, with a simple and easy method, it is possible to cause the visitor to feel as if the manufactured article is delivered by the character with the unmanned aerial vehicle.

In the delivery system of the present disclosure, respective chimney-shaped tubes are provided on a roof of the manufacturing station and on a roof of the delivery station. The unmanned aerial vehicle may fly out of one of the tubes and then fly to enter the other one of the tubes.

This makes it possible to cause the visitor to feel as if the manufactured article is really delivered by the character with the unmanned aerial vehicle.

In the delivery system of the present disclosure, the unmanned aerial vehicle may be a drone, a flying boat, or a balloon.

Thus, when the unmanned aerial vehicle is a flight vehicle related to a specific story or movie, it is possible to cause the visitor to feel as if the manufactured article is delivered by the character with the unmanned aerial vehicle.

The present disclosure can provide a delivery system in which visitors in a predetermined area can spend time happily by causing the visitors to feel as if a manufactured article is delivered by a character with an unmanned aerial vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a configuration diagram of a delivery system of an embodiment.

DETAILED DESCRIPTION OF EMBODIMENTS

With reference to the drawings, the following describes a case where a delivery system 100 is applied to a theme park 80. As illustrated in FIG. 1, the delivery system 100 is constituted by a cooking station 10, a meal serving station 20, a meal conveying device 40, a drone 30 as an unmanned aerial vehicle, and a controlling portion 90.

Here, the theme park 80 is a tourist facility that is entirely produced based on a specific theme such as a culture, a country, a story, a movie, or an era. The theme park 80 is provided with facilities that perform attraction producing a scene of a specific movie or the like, and visitors can have a feeling of closeness to characters in the movie.

The cooking station 10 is a building in which a meal 50 is prepared based on an order from a visitor 81 in the theme park 80, and the meal 50 thus prepared is provided. The cooking station 10 constitutes a manufacturing station as described in Claims, and the meal 50 constitutes a manufactured article. A cooking station side tube-shaped body 11 having a chimney shape is provided on a roof of the cooking station 10. Here, the meal 50 may be, for example, a set meal such as a combination meal including a main dish, a side dish, a miso soup, and so on as one set or may be a single dish of food such as a rice dish, curry and rice, udon, or soba noodle. Further, the meal 50 may be also a set meal of a hamburger and juice, or the like.

The meal serving station 20 is a building in which the meal 50 is received from the cooking station 10, and the meal 50 is served on a meal serving table 22 from which the visitor 81 receives the meal 50. Similarly to the cooking station 10, a meal serving station side tube-shaped body 21 having a chimney shape is provided on a roof of the meal serving station 20. The meal serving station 20 constitutes a delivery station as described in Claims.

The meal conveying device 40 is constituted by a meal conveying passage 41 via which the cooking station 10 is connected to the meal serving station 20 under the ground, and a carrier 42 configured to travel autonomously in the meal conveying passage 41. The meal conveying device 40 constitutes a manufactured-article conveying device as described in Claims, the meal conveying passage 41 constitutes a manufactured-article conveying passage as described in Claims, and the carrier 42 constitutes the manufactured-article conveying device as described in Claims.

The drone 30 can fly autonomously. The drone 30 flies between the cooking station side tube-shaped body 11 of the cooking station 10 and the meal serving station side tube-shaped body 21 of the meal serving station 20. A model 31 of a character appearing in an attraction in the theme park 80 is attached to an outer surface of the drone 30. FIG. 1 illustrates an example in which a model of a witch getting on a broom and appearing in an attraction is attached.

The controlling portion 90 is a computer including a CPU 91 as a processor executing information processing, and a memory 92 in which a program or control data is stored. The controlling portion 90 is connected to the cooking station 10, the meal serving station 20, the drone 30, and the carrier 42 via a communications line 93 such as the Internet or a telephone network.

The following describes an operation of the delivery system 100.

When the controlling portion 90 receives an order for the meal 50 from a portable terminal 82 of the visitor 81, the controlling portion 90 transmits the order details to the cooking station 10. In the cooking station 10, a cook prepares the meal 50 based on the received order. After the meal 50 is prepared, the cook places the meal 50 on a meal tray (not shown) in the cooking station 10. When the meal 50 is placed on the meal tray, the cooking station 10 outputs a tray-supply signal to the controlling portion 90.

When the controlling portion 90 receives the tray-supply signal from the cooking station 10, the controlling portion 90 outputs, to the meal conveying device 40, a command to convey the meal 50 placed on the meal tray to the meal serving station 20. When the meal conveying device 40 receives this command, the meal conveying device 40 places the meal 50 on the carrier 42 and starts moving the carrier 42 toward the meal serving station 20 in the meal conveying passage 41 provided under the ground. The meal conveying device 40 outputs, to the controlling portion 90, information indicating that the carrier 42 has been started.

When the controlling portion 90 receives, from the meal conveying device 40, the information indicating that the carrier 42 has been started, the controlling portion 90 outputs, to the drone 30, a command to leave the cooking station 10 and fly toward the meal serving station 20. When the drone 30 receives this command, the drone 30 flies out of the cooking station side tube-shaped body 11 of the cooking station 10 and starts flying toward the meal serving station 20. Then, the drone 30 enters the meal serving station side tube-shaped body 21. When the drone 30 enters the meal serving station side tube-shaped body 21, the drone 30 outputs an arrival signal to the controlling portion 90.

At this point, the carrier 42 has already arrived at the meal serving station 20, and the meal 50 has been dropped off in the meal serving station 20.

When the controlling portion 90 receives the arrival signal from the drone 30, the controlling portion 90 outputs, to the meal serving station 20, a command to provide the meal 50 on the meal serving table 22 of the meal serving station 20. When the meal serving station 20 receives this command, the meal serving station 20 provides the meal 50 on the meal serving table 22. Then, the visitor 81 receives the meal 50 from the meal serving table 22.

Thus, in the delivery system 100, just after the drone 30 has arrived at the meal serving station 20, the meal 50 is provided on the meal serving table 22, and then, the meal 50 is served to the visitor 81. Accordingly, the visitor 81 feels as if the character conveys the meal 50 or the character conveys the meal 50 by getting on the drone 30, though the meal 50 actually has been conveyed by the meal conveying device 40 provided under the ground. Hereby, the visitor 81 can enjoy eating in the theme park 80.

In the above description, the meal serving station 20 serves the meal 50 on the meal serving table 22, and the visitor 81 receives the meal 50 from the meal serving table 22. However, the present disclosure is not limited to this.

For example, the meal 50 may be conveyed from the meal serving table 22 of the meal serving station 20 to a table 71 of the visitor 81 by use of an autonomously travelable meal conveying vehicle 60 connected to the controlling portion 90 via the communications line 93. In this case, a side face of the meal conveying vehicle 60 may be decorated with an image of the character. Hereby, the visitor 81 feels as if the meal 50 is delivered by the character and the meal conveying vehicle 60 decorated with the image of the character, and the visitor 81 can enjoy eating in the theme park 80.

Further, in the above description, the meal conveying device 40 is constituted by the meal conveying passage 41 provided under the ground and the carrier 42. However, the present disclosure is not limited to this. For example, a self-driving vehicle configured to travel by self-driving between the cooking station 10 and the meal serving station 20 may be employed. In this case, the meal conveying passage 41 provided under the ground is unnecessary. Accordingly, with a simple and easy configuration, the visitor 81 can feel as if the meal 50 is delivered by the character with the drone 30, and the visitor 81 can enjoy eating.

In the above description, the unmanned aerial vehicle is the drone 30. However, the present disclosure is not limited to this. In a case where a flying boat appears in the movie or the like, a model of the flying boat may be decorated with the image of the character, or in a case where an airship appears in the movie or the like, a model of the airship may be decorated with the image of the character.

Further, the above description deals with the following example. That is, after the controlling portion 90 starts moving the carrier 42, the controlling portion 90 starts moving the drone 30. The carrier 42 arrives at the meal serving station 20 first, and after that, the drone 30 arrives at the meal serving station 20. Then, the meal 50 is provided on the meal serving table 22 just after the drone 30 has arrived. However, the present disclosure is not limited to this example, provided that the meal 50 can be served just after the drone 30 has arrived at the meal serving station 20. For example, the controlling portion 90 may be configured to start moving the drone 30 just after the carrier 42 has arrived at the meal serving station 20 and to serve the meal 50 just after the drone 30 has arrived at the meal serving station 20.

In the above description, the delivery system 100 is applied to the theme park 80 as a predetermined area such that a meal as a manufactured article is conveyed from the cooking station 10 as a manufacturing station to the meal serving station 20 as a delivery station. However, the delivery system 100 can be also applied to a case where other manufactured articles are delivered in other areas.

For example, the delivery system 100 may be applied to a baseball field or the like as follows. That is, the baseball field or the like includes a manufacturing station in which goods related to players are manufactured, and a delivery station where their fans receive the goods as manufactured articles. The drone 30 on which a mark or the like of a baseball team of the players is displayed flies between the manufacturing station and the delivery station, while the goods are conveyed by a manufactured-article conveying device provided under the ground. Then, the goods are provided to the fans at the delivery station.

What is claimed is:

1. A delivery system in a predetermined area, the delivery system comprising:
   a manufacturing station in which a manufactured article to be served to a visitor in the predetermined area is prepared;
   a delivery station in which the manufactured article is provided on a serving table;
   an unmanned aerial vehicle configured to go back and forth between the manufacturing station and the delivery station without the manufactured article;
   a manufactured-article conveying device including a conveying passage and a carrier, the conveying passage connecting the manufacturing station and the delivery station underground, and the carrier being configured to travel autonomously in the conveying passage; and
   a processor connected to the manufacturing station, the delivery station, the unmanned aerial vehicle, and the manufactured-article conveying device, wherein:
   the unmanned aerial vehicle is decorated with a display of the predetermined area; and
   the processor is configured to
      cause the manufactured-article conveying device to convey the manufactured article from the manufacturing station to the delivery station, the manufactured-article conveying device being configured to convey the manufactured article by causing the carrier on which the manufactured article is placed to move from the manufacturing station to the delivery station in the conveying passage,
      cause the unmanned aerial vehicle to fly from the manufacturing station toward the delivery station after the carrier on which the manufactured article is placed starts moving toward the delivery station, and
      just after the unmanned aerial vehicle has arrived at the delivery station, cause the delivery station to serve, with the serving table, the manufactured article conveyed by the manufactured-article conveying device to the visitor.

2. The delivery system according to claim 1, wherein:
   respective chimney-shaped tubes are provided on a roof of the manufacturing station and on a roof of the delivery station; and
   the unmanned aerial vehicle is configured to fly out of one of the tubes and then fly to enter the other one of the tubes.

3. The delivery system according to claim 1, wherein the unmanned aerial vehicle is a drone, a flying boat, or a balloon.

4. The delivery system according to claim 1, wherein the manufactured article is a meal prepared based on an order from the visitor.

5. The delivery system according to claim 1, wherein
   the manufactured-article conveying device is configured to output, to the processor, departure information indicating that the carrier has started to move toward the delivery station in response to the carrier having started to move toward the delivery station,
   the unmanned aerial vehicle is configured to output, to the processor, an arrival signal indicating that the unmanned aerial vehicle has arrived at the delivery station in response to the unmanned aerial vehicle entering the delivery station, and
   the processor is configured to,
      in response to receiving the departure information from the manufactured-article conveying device, output, to the unmanned aerial vehicle, a command to leave the manufacturing station and fly toward the delivery station such that the unmanned aerial vehicle arrives at the delivery station after the carrier arrives at the delivery station, and
      in response to receiving the arrival signal from the unmanned aerial vehicle, output, to the delivery station, a command to provide the manufactured article on the serving table.

* * * * *